April 15, 1969    J. J. McKINLEY, JR    3,438,241
GAS DETECTION APPARATUS

Filed Sept. 23, 1964    Sheet 2 of 2

INVENTOR.
J. J. McKinley, JR
BY
ATTORNEY 3,438,241
GAS DETECTION APPARATUS
James J. McKinley, Jr., Texas City, Tex., assignor to Monsanto Company, St. Louis, Mo., a corporation of Delaware
Filed Sept. 23, 1964, Ser. No. 398,548
Int. Cl. G01n 31/06
U.S. Cl. 73—23                                                    6 Claims

ABSTRACT OF THE DISCLOSURE

An apparatus and method for the detection and measurement of certain gases present in gaseous or liquid mixtures employing a selectively permeable membrance for separation of the desired component.

---

The present invention relates to a new and improved apparatus and method for the detection of gases. More particularly, the present invention relates to a new and improved apparatus and method for the detection and measurement of certain gases when present in gaseous or liquid mixtures.

It is well known in the prior art that hydrogen, helium and other "small molecule" materials may be separated from other materials by selective permeation through selectively permeable membranes. Separation by this technique has been used for analysis of hydrogen in particular. U.S. Patent 2,671,336 teaches a hydrogen analyzing means comprising a small diameter platinum or palladium tube, closed at one end, through which hydrogen is selectively diffused, and a means for measuring the pressure of the hydrogen diffused into the small diameter tube. The basis for this analytical technique is that the pressure of the hydrogen in the small tube represents the partial pressure of the hydrogen in the mixture and thus the concentration of hydrogen in the mixture. While representing a useful analytical technique, this prior art hydrogen analyzer suffers several distinct disadvantages. First, because of the time necessary for build-up of sufficient pressure in the small tube to be accurately measurable, a significant time lag exists between the time of injection of the mixture to be analyzed and the time the hydrogen in the mixture is detected and measured. This time lag, of course, detracts substantially from the use of this prior art instrument when continuous analysis is desired. A second disadvantage is that a clearly defined reading of the hydrogen concentration is more difficult to obtain because of the gradual build-up of the hydrogen pressure. A further disadvantage of this particular system is the expense of the platinum or palladium permeable membrane. Still further, this system suffers the disadvantage that the temperature at which it is operated is limited to relatively high temperatures and extreme care is necessary to keep the small tube free of any leaks.

It is an object of the present invention to provide a new and improved method and apparatus for the detection and measurement of gases. Another object of the present invention is to provide a new and improved method and apparatus for the detection and measurement of certain gases by selective permeation of said gases through a permeable membrane. A further object of the present invention is to provide a new and improved method and apparatus for the detection and measurement of certain gases by diffusion of said gases through a permeable membrane whereby the response time for the detection and measurement of said gases is substantially reduced. It is also an object of the present invention to provide a new and improved method and apparatus for the detection and measurement of certain gases by permeation of said gases through a permeable membrane whereby increased sensitivity is obtained. Yet another object of the present invention is to provide a new and improved method and apparatus for the detection and measurement of certain gases by permeation of said gases through a permeable membrane whereby membranes of substantially reduced cost may be used. Additional objects will become apparent from the following description of the invention herein disclosed.

According to the present invention, there is provided an apparatus comprising a permeation chamber having an inlet and an outlet, at least a portion of the wall of said permeation chamber being a selectively permeable membrane, said membrane being selectively permeable by the component to be detected and measured, means for flowing a medium containing the component to be detected and measured into contact with said selectively permeable membrane, means for flowing a carrier gas through said chamber to carry the component selectively permeating said membrane, and a detection and measuring means whereby the component to be detected and measured is detected and measured in said carrier gas.

In a particularly preferred embodiment of the present invention, the above described permeation chamber is tubular in shape and is positioned within a sample chamber into which the medium containing the component to be detected and measured is introduced.

"Selectively permeable membrane" as used herein, refers to a macroporous barrier which will allow certain molecules to permeate the barrier to the exclusion of others without regard to the mechanism responsible for permeation. The selective permeability is most often on the basis of molecular diameter, however, the pore size and structure of the macroporous barrier being such as to allow molecules of smaller molecular diameter to permeate the barrier to the exclusion of molecules of larger molecular diameter.

According to the present invention, there also is provided a method for detecting and measuring the concentration of those components diffusable through a selectively permeable membrane contained in mixtures which comprises contacting said mixture with a selectively permeable membrane, continuously passing a carrier gas over the opposite surface of said selectively permeable membrane and passing said carrier gas to a detecting and measuring means whereby the concentration of said components diffusable through said selectively permeable membrane are detected and measured.

In a preferred embodiment the present invention comprises a method for detecting and measuring the concentration of those components diffusable through a selectively permeable membrane contained in mixtures which comprises permeating said components through a selectively permeable membrane, continuously removing said components permeating said selectively permeable membrane from the surface of said selectively permeable membrane with a carrier gas to a detecting and measuring means to thereby detect and measure the concentration of said components diffusable through a selectively permeable membrane.

The present invention provides many advantages not heretofore obtainable with prior art instruments. Of particular significance is the substantial reduction in the time elapsing between permeation of the permeating components through the selectively permeable membrane and the detection and measurement response to said permeation. Also, of significance is the more clearly defined detection and measurement response obtained through use of the present invention. Further advantages resulting from the present invention are that the sample to be analyzed may be liquid or gaseous and if liquid, may be in two or more phases or may even contain solid impurities. It is also rather significant that the present apparatus and method are operable over considerably wider ranges of temperatures than many prior art instruments and methods.

In order to further describe the present invention, reference is made to the accompanying drawings.

Figure 1:
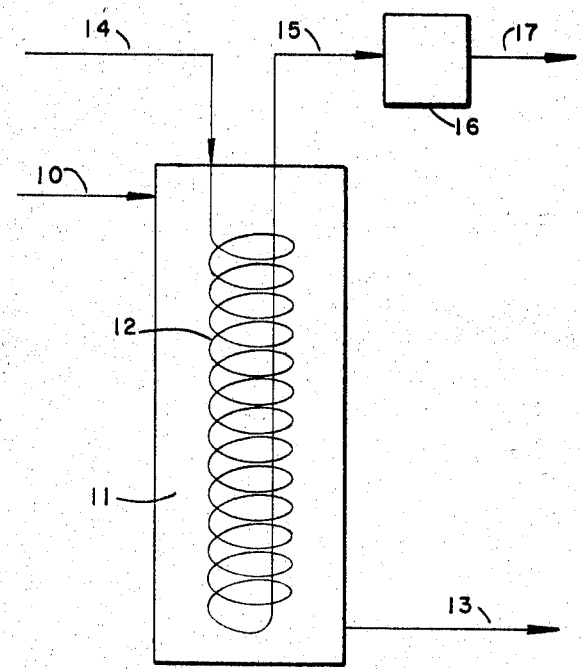
FIGURE 1 is a diagramatic representation of an embodiment of the present invention showing the permeation chamber positioned in a larger sample chamber.

Referring first to FIGURE 1, a hydrocarbon stream containing hydrogen which is to be analyzed for hydrogen concentration is introduced by means of inlet line 10 into sample chamber 11 within which is positioned a helically coiled length of polytetrafluoroethylene tubing 12 which is selectively permeable to the hydrogen. On contact with tubing 12 hydrogen molecules permeate through the walls of tubing 12. The hydrocarbon stream, after removal of hydrogen which permeates into tubing 12 is vented from sample chamber 11 by means of line 13. Nitrogen, as an inert carrier gas, is continuously passed by means of line 14 into and through tubing 12 picking up and sweeping from tubing 12 the hydrogen which has preferentially permeated the selectively permeable walls of tubing 12. The nitrogen carrying the hydrogen flows from tubing 12 by means of outlet line 15 into low volume katharometer 16 which is used to measure the concentration of hydrogen in the carrier gas. Instead of a low volume katharometer, any detecting and measuring means suitable for detecting and measuring the particular components for which analysis is desired may be used. Conveniently, however, a conventional katharometer is preferred. The concentration of the hydrogen found in the carrier gas is directly referable to the concentration of hydrogen in the initial mixture. The carrier gas containing the hydrogen is vented from katharometer detector 16 via line 17.

Figure 2:
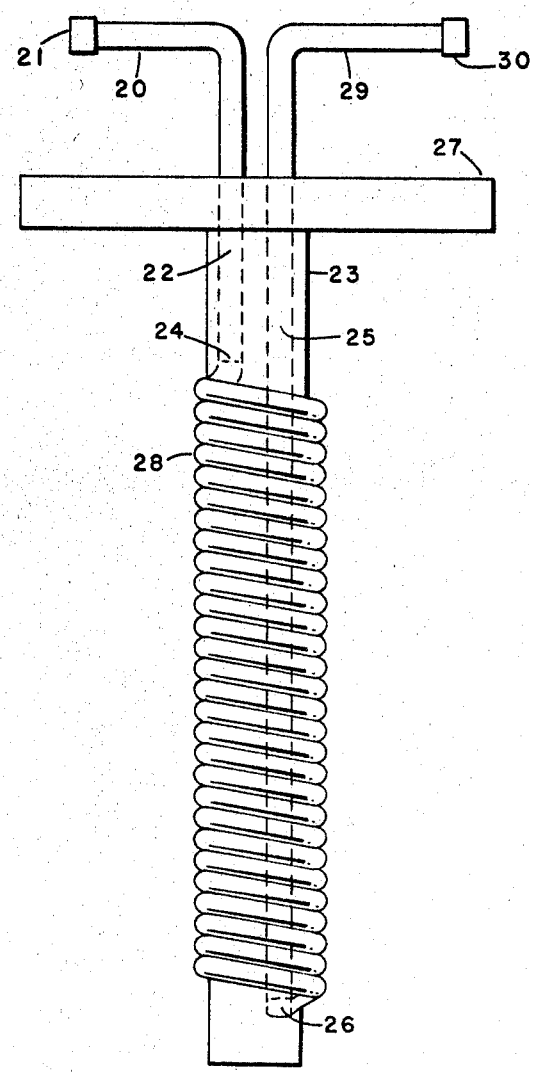
FIGURE 2 is an elevational view of a preferred configuration and embodiment of the permeation chamber of the present invention.

Referring next to FIGURE 2, there is provided a nonpermeable tubing 20 having open inlet end 21 adapted for attachment with a carrier gas source (not shown) such that tubing 20 is in open communication with said carrier gas source. Tubing 20 is connected to a passageway 22 in support rod 23, passageway 22 having a terminating end 24. Support rod 23 is also provided with another tube and passageway 25 having a terminating end 26. Support rod 23 is mounted through flange 27 for removably attaching the gas sampling device to a sample chamber or conduit (not shown). Selectively permeable tubing 28 is helically wrapped around support rod 23 and connected at one end to terminating end 24 of passageway 22 and at the other end to terminating end 26 of passageway 25. Passageway 25 is connected to tubing 29 having opening 30 adapted for attachment to a means for detecting and measuring at least a portion of the components in the effluent from tubing 29.

The selectively permeable membranes useful in the present invention generally are polymeric plastic compositions. However, in some instances selectively permeable metal membranes may be used in carrying out the present invention. For example, platinum or palladium metal membranes may be used when hydrogen is the small molecular diameter component of a mixture for which detection and measurement is desired. Such metal membranes are usually avoided because of their relatively high cost and the relatively high temperatures generally necessary to their operation. In some instances, quartz membranes may be desired, particularly for the detection and measurement of helium. In the practice of the present invention, considerably less expensive polymeric plastic membranes provide sufficiently selective permeability for accurate detection and measurement of small molecular diameter molecules when in admixture with larger molecular diameter components. The particular membrane selected will depend to a considerable extent upon the components of a mixture for which analysis is desired. The membrane chosen must be one having a structure and a pore size such that the molecules of the component for which detection and measurement is desired may readily permeate the membrane while those molecules of the mixture for which detection and measurement is not desired may not. Practically any of the polymeric plastic compositions may be formed into selectively permeable membranes for use in the present invention. Among these polymeric plastic compositions are the polyesters such as polyethylene sebacate, acrylated polyethylene sebacate and the like. Polyamides also find utility in the present invention. Another very useful group of polymeric plastic materials are the polyvinyl halides and their co-polymers. Included within this group are such materials as polyvinyl chloride, polyvinyl chloride-polyvinyl acetate co-polymers, and the like. The cellulosics provide another group of plastic materials which may be used within the present invention. This group includes cellulose acetate, cellulose triacetate, cellulose acetate butyrate, ethyl cellulose, cellulose nitrate, and others. Still another group of plastic materials useful in the present invention include polystyrenes, polyvinyl toluene, polyethyl methacrylate, urea formaldehyde laminates, polyethylenes and the like. A particularly useful polymeric plastic material is polytetrafluoroethylene. In many instances, a number of the above polymeric plastic compositions may be modified as to their permeability by the addition of plasticizers. Some plasticizers increase permeability while other decrease permeability. Among the plasticizers which may be added are such well known plasticizers as the dialkylphthalates, particularly dioctylphthalate, dibutylphthalate, etc. Also hydrocarbon plasticizers such as heavy aromatic oils and the like may be used to change the permeability characteristics of the various polymeric plastics useful in the present invention. The means of testing plastic materials for their permeability are well known to the art, therefore, those skilled in the art will have little difficulty in finding the proper polymeric plastic composition to be used in the analysis of the different small molecular diameter molecules for which analysis may be desired in accordance with the present invention. A particular useful source of teachings on the testing of plastic materials for permeability is "The Properties and Testing of Plastic Materials," second edition, Chemical Publishing Company, Inc., 1962.

The thickness of the selectively permeable membrane will vary to some extent with the composition and to a lesser degree with the material to be permeated therethrough, the configuration of the membrane as well as the conditions of temperature and pressure. Generally the membrane has a thickness of no greater than 0.1 inch nor less than 0.0001 inch. More often, however, the selectively permeable membrane has a thickness within the range of 0.001 to 0.02 inch. When the preferred polymeric plastic selectively permeable membrane, polytetrafluoroethylene, is used, a thickness of 0.005 to 0.015 inch is preferred.

The selectively permeable membrane of the present invention may be flat, conical, spherical or tubular in configuration, or may be of any other convenient shape. Generally, it is desired to have a high surface area of membrane exposed to the mixture to be analyzed, particularly in relation to the internal cross-sectional area of the chamber through which the carrier gas flows. For this reason it is usually preferred that the selectively permeable membrane be tubular in shape. In this preferred shape of the membrane, the permeating molecules permeate into the internal passage of the tubing through which the carrier gas is passed. Usually, with the tubular selectively permeable membrane a small internal diameter is desired in relation to its length. Most useful are tubular selectively permeable membranes having internal diameters of 0.012 to 0.5 inch and a length of 1 to 100 feet. With the preferred polytetrafluoroethylene tubular membranes, an internal diameter of 0.025 to 0.125 inch and a length of 4 to 15 feet are preferred. In a particularly preferred embodiment, an inert material such as a steel wire having a cross-sectional area sufficiently less than the internal cross-sectional area of the tubular permeation chamber to allow passage of the permeating gases and the carrier gases between the wire and the walls of the tubular chamber is contained within the tubular permeation chamber. The presence of such material in the tubular permeation chamber causes an increase in the ratio of surface area of exposed permeable membrane to usable internal cross-sectional area of the tubular chamber.

The present invention is useful in the analysis of mixtures either liquid or gas, which may be separated by selective permeation through a selectively permeable membrane. By proper choice of the selectively permeable membrane, a wide range of components may be selectively permeated through a membrane and detected and measured in accordance with the present invention. Such small molecular diameter molecules as those of hydrogen, helium, nitrogen, oxygen and argon are readily detectable and measurable by the present apparatus and method. In addition, such other components as ammonia, methane, carbon dioxide, sulfur dioxide, hydrogen sulfide, hydrogen chloride and the like may also be measured in accordance with the present invention. In the particularly preferred utility for the present invention it is used for the detection and measurement of either hydrogen or helium.

Virtually any of the well known carrier gases such as those used in conventional chromatographic analysis techniques may be used in the practice of the analytical method of the present invention to carry those molecules permeating the selectively permeable membrane to the detection and measurement means. Such gases include hydrogen, helium, nitrogen, carbon dioxide, argon, neon, ethane, propane, butane and the like. Of course, the carrier gas must not be the same as the component of the mixture permeating the selectively permeable membrane for which analysis is desired. For example, if the component permeating the membrane is hydrogen, then hydrogen obviously would not be used as a carrier gas. Further, a carrier gas should be selected which does not interfere with detection and measurement of the components permeating the membrane because of similarity of properties. For example, helium is preferably not used to carry hydrogen to the detection and measurement means because of the difficulty of differentiating between the two gases inherent in most conventional detection and measurement means. In some instances, it is desirable to select a carrier gas which will "blank out" one or more of the components permeating the membrane when two or more components permeate the selectively permeable membrane. If, for example, both hydrogen and nitrogen permeate the membrane and detection and measurement of hydrogen alone is desired, nitrogen might be used as a carrier gas in order that the nitrogen permeating the membrane would not be detected as another component, thus, reducing the possibility of confusion of detection. In the preferred utilization of the present invention, that of detecting and measuring hydrogen or helium, the preferred carrier gases are nitrogen and argon.

The carrier gas flow rate has been found to be of some criticality in the analytical method of the present invention. As the flow rate increases, the sensitivity of the detection and measurement usually decreases. Flow rates of the carrier gas may be varied widely depending on other conditions and particularly with the membrane composition and configuration. With the preferred tubular polytetrafluoroethylene membrane, flow rates on the order of 3 to 100 volumes per minute per volume of internal space within the tubular membrane are usually preferred.

The conditions of temperature, pressure and contact time for the analytical method of the present invention may vary over relatively broad ranges. The temperatures may range as high as that at which the membrane is destroyed. Usually, however, temperatures below 250° C. are used. Low temperatures, generally below 0° C. are usually avoided as at such lower temperatures, the permeation rate of molecules through the selectively permeable membrane significantly decreases. The most useful temperatures for practicing the present analytical technique are above 25° C. The pressure at which the present analytical technique may be used include subatmospheric, atmospheric and superatmospheric pressures. Usually, for convenience, the pressure is no greater than 200 p.s.i.g. or lower than 20 mm. Hg. The primary consideration in regard to pressure is that of the partial pressure of the component to be measured in the mixture sample in relation to its partial pressure on the mixture sample side of the selectively permeable membrane. Also, the pressure on the outside surface of the permeable membrane wall of the permeation chamber is preferably maintained constant. Contact time of the mixture to be analyzed with the permeable membrane may range from a fraction of a second to several minutes. However, since one of the primary advantages of the present invention is found in the faster response time, long contact times are seldom used.

The means for detecting and measuring the components of the mixture to be analyzed which permeate the selectively permeable membrane will vary depending upon the component. Practically any means which will detect and measure such components may be used. Such means include gas density detectors, katharometers, ionization detectors, electrochemical detectors and the like. As a practical matter, it is usually preferred to use a katharometer detector. The thermal conductivities of most gases are well known. Thus, by measuring the thermal conductivity of the carrier gas effluent from that side of the permeable membrane opposite the mixture to be analyzed, the components of the carrier gas which permeate the membrane may be readily detected and measured.

What is claimed is:

1. An apparatus for the detection and measurement of gases which comprises a permeation chamber having an inlet and an outlet, at least a portion of the wall of which is a selectively permeable membrane, sample chamber means for flowing a fluid medium containing the component to be detected and measured into contact with the exterior surface of said permeation chamber, at least a portion of the wall of said sample chamber being said permeable membrane, means for flowing a carrier gas through said permeation chamber for carrying the component selectively permeating said membrane to a katharometer whereby the component to be detected and measured is detected and measured in said carrier gas.

2. The apparatus of claim 1 wherein the selectively permeable membrane is a polymeric plastic composition.

3. The apparatus of claim 2 wherein said polymeric plastic composition is one selected from the group consisting of polyesters, polyamides, cellulosics, polystyrenes, polyolefins, polyvinyl aryls, vinyl halide polymers and vinyl halide co-polymers.

4. The apparatus of claim 2 wherein the polymeric plastic composition is polytetrafluoroethylene.

5. The apparatus of claim 1 wherein the permeation chamber is a selectively permeable membrane tubular in shape.

6. The apparatus of claim 1 wherein the selectively permeable membrane is a polymeric plastic composition having a thickness of 0.1 to 0.0001 inch.

(References on following page)

References Cited

UNITED STATES PATENTS

| | | | |
|---|---|---|---|
| 2,861,450 | 11/1958 | Ransley | 73—19 |
| 3,176,500 | 4/1965 | Coe | 73—19 |
| 2,400,940 | 5/1946 | McCollum | 73—23 |
| 2,456,163 | 12/1948 | Watson | 73—23 |
| 2,671,336 | 3/1954 | Hulsberg | 73—23 |
| 2,671,337 | 3/1954 | Hulsberg | 73—23 |
| 2,817,229 | 12/1957 | Beard | 73—26 |
| 2,841,005 | 7/1958 | Coggeshall | 73—23.1 |
| 3,221,537 | 12/1965 | Jacobsen | 73—23 |

OTHER REFERENCES

Journal of Applied Physics, vol. 28, No. 1, January 1957, Permeation of Gases Through Solids, by F. J. Norton, pp. 34–39.

JAMES J. GILL, *Primary Examiner.*

C. IRVIN McCLELLAND, *Assistant Examiner.*

U.S. Cl. X.R.

73—19